July 22, 1969  KUNIMORI MARUYAMA  3,456,528
APPARATUS FOR DRIVING AN AUTOMATIC DOOR OPERATOR
Filed Sept. 27, 1967  2 Sheets-Sheet 1

United States Patent Office 3,456,528
Patented July 22, 1969

3,456,528
APPARATUS FOR DRIVING AN AUTOMATIC DOOR OPERATOR
Kunimori Maruyama, Tsurumi-ku, Yokohama, Japan, assignor, by mesne assignments, to Matsushita Denko Kabushiki Kaisha, Osaka-fu, Japan
Filed Sept. 27, 1967, Ser. No. 670,860
Claims priority, application Japan, Sept. 29, 1966, 41/63,737, 41/63,738
Int. Cl. F16h 3/62; E05f 15/16, 15/20
U.S. Cl. 74—785                                    5 Claims

ABSTRACT OF THE DISCLOSURE

An apparatus for transmitting the driving power from a driving motor to an actuating arm of an automatic door operator, comprising a planetary gear mechanism and a rotation control member for controlling the rotation of an internal gear of the planetary gear mechanism, for allowing the idling of the internal gear so as to prevent any pinching of a part of human body by the closing door and any stoppage and seizure of the driving motor.

BACKGROUND OF THE INVENTION

This invention relates to an apparatus for driving an actuating rod or arm (hereinunder simply called as an "actuator") for causing the opening and closing movements of an automatic door.

Heretofore, various kinds of such apparatuses were proposed, but they still have some faults. In a type that the action of the actuator is strong and reliable, there is a fault that a driving motor is apt to be seized when a heavy load is applied to the motor as in the case that a human body is caught by the door. In a type that such trouble is taken into consideration in designing, the construction thereof becomes very complicated and expensive.

SUMMARY OF THE INVENTION

This invention aims to solve the above-mentioned faults, and has for its object to provide a driving apparatus of simple construction capable of reliable transmission of the driving power to an actuator through planetary gears, and also capable of idle rotation of a driving motor not to apply any excessive load thereon when an obstacle is caught by a closing door.

This invention therefore resides in an apparatus for driving an automatic door operator, comprising a rotation device composed of driving sun gear, a plurality of planetary gears surrounding said driving sun gear in meshed relation therewith, and an internal gear arranged in meshed relation with said planetary gears; an actuating device composed of an actuating disc having an actuating shaft for actuating a door-operated actuator and connected to said planetary gears in such a manner that said actuating disc can be rotated around said sun gear in accordance with the rotation of said planetary gears and also said planetary gears can be rotated on their axes; and control means arranged in contact with said internal gear.

The apparatus of this invention can thus provide various technical merits. Namely, the operation of the door is very steady since the actuating shaft 14 for driving the door-operating actuator is driven by gear transmission. The mechanism for changing the rotational direction becomes very simple since the planetary gear system is adopted. There is no bad reaction to the actuating shaft 14 even if any obstacle is caught by the closing door, since the internal gear 8 is rotated or idled by the action of its reduced rotation and the rotation of the planetary gears on their axes, thereby there is no harm to a person, and no fear of any seizure of the motor.

DESCRIPTION OF THE PREFERRED EMOBODIMENTS

Figure 1:
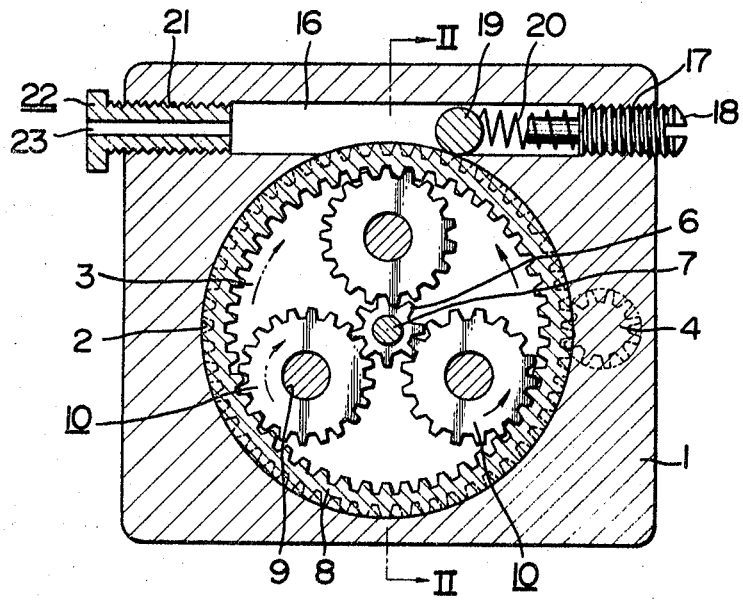
FIGURE 1 shows a front vertical section of a first embodiment of this invention.
Figure 2:
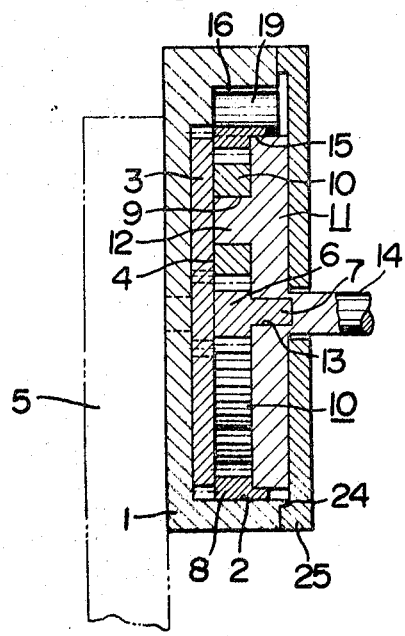
FIGURE 2 is a section taken along line II—II of FIGURE 1.
Figure 3:
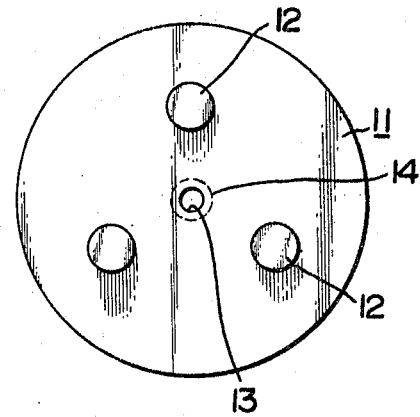
FIGURE 3 is a front view of an actuating disc used in the first embodiment.

In the first embodiment shown in FIGURES 1–3, a rotation device is composed of a rotation gear 3 and a gear 4. The rotation gear 3 is arranged in a bore 2 formed at the center of a base plate 1 and is meshed with the gear 4 driven by a motor 5 in the base plate 1. Accordingly, the rotation gear 3 can be rotated by the actuation of the motor 5. In the central part of the rotation gear 3 a driving sun gear 6 is integrally formed. The driving sun gear 6 has a projection 7. Also in the bore 2, an internal gear 8 is rotatably mounted in a coaxial relation with the rotation gear 3. In the spaced defined between the internal gear 8 and the driving sun gear 6, a plurality of planetary gears 10 (for example three gears) are arranged keeping an equal interval with each other so as to be meshed with the internal gear 8 and with the driving sun gear 6 for rotating about the rotation gear 3 and on their axes.

The actuating device is composed of an actuating disc 11 which has a plurality of supporting shafts 12 (for example three shafts as shown) projected from one side of the disc 11 at an equal interval for allowing their insertion into holes 9 of the rotation gear 3, and a central insertion bore 13 for receiving the projection 7 of the driving gear 6. On the other side of the disc 11, there is also formed a central shaft 14 which is a transmission means for an actuator (not shown) acting as means for operating a door. The planetary gears 10 accordingly are supported by the supporting shafts 12 and can be rotated thereon. The outer periphery of the actuating disc 11 rests on a stepped portion 15 of the internal gear 8.

In order to form a control device, a control bore 16 is drilled into the upper part of the base plate 1 in such a manner that the bore 16 will communicate with the bore 2, and a part of the cylindrical outer periphery will be projected into the bore 16. At one end of the bore 16, there is provided with a threaded part 17 and an adjusting screw 18 screwed into the threaded part 17, and a controller 19 of a roller-type. Ths controller 19 is always urged to the outer periphery of the internal gear 8 by the force of a spring 20. On the other side of the bore 16, there is provided with a similar threaded part 21 to which a closing sleeve is screwed for preventing any desertion of the controller 19 from this side. At the center of the closing sleeve 22, there is an aperture 23. By inserting an appropriate slender rod into the aperture 23, the controller 19 can be returned to its normal position even if it were moved to a certain leftward positon where it bites the outer periphery of the internal gear and prevents normal rotation of the same.

Further, a reference numeral 24 shows a cylndrical projection of the base plate 1 for registering the angular positon of a cover 25 which is fixed to the base plate 1 for preventing the dismounting of the actuating disc 11.

By the construction above mentioned, the apparatus of this invention functions as follows:

When a person steps on a switch means such as a stepplate arranged in front of the automatic door, the motor is initiated to rotate the rotation gear 3 through the gear 4. The integral driving sun gear 6 therefore is rotated in the direction shown by a solid line in FIGURE 1, and the planetary gears 10 are rotated on their axes in the direction shown by a solid line for urging the internal gear 8 to rotate in the direction shown by a solid line. However, the internal gear 8 cannot be rotated since the controller 19 is pushed by the force of the spring 20 and acts as a wedge between the internal gear 8 and the control bore 16. Accordingly, the planetary gears are rotated on their axes in the direction shown by the solid line and also about the driving sun gear 6 in the clockwise direction. By virtue of the rotation of the planetary gears about the driving sun gear 6, the actuating disc 11 is rotated in the clockwise direction by means of the supporting shafts 12.

Contrary, when the person steps out from the step-plate, the motor is rotated reversely to drive the driving sun gear 6 in the direction shown by a dotted line. By this rotation of the driving sun gear 6, the planetary gears 10 are rotated on their axes as shown in a dotted line and pushes the internal gear 8 in the direction shown by a dotted line. Since the internal gear 8 could not freely move due to the force-abutment of the spring-loaded controller 19, the rotation of the internal gear 8 is reduced in spite of the pushing force of the planetary gears. Accordingly, the planetary gears 10 are rotated about the driving sun gear 6 in accordance with the abovementioned reduction of the rotation of the internal gear 8, while they are rotated on their axes. By the rotation of the planetary gears 10, the actuating shaft 14 is rotated in the counter-clockwise and closes the door slowly.

If an obstacle such as a portion of a human body is caught by the door during the above-mentioned closing operation, the movement of the actuator (not shown) is stopped, and therefore the rotation of the actuating shaft 14 is stopped. Under these conditions, the rotation of the planetary gears about the sun gear is prevented by the supporting shafts 12, and the planetary gears are rotated only on their axes. Accordingly, the internal gear 8 is rotated in the direction shown by the dotted line, pushing the controller 19 to the adjusting screw side against the force of the spring 20. Thus no stopping load is applied onto the motor 5. Therefore, the motor 5 can continue to be rotated as in the case of normal condition.

In the foregoing embodiment, the planetary gears 10 are supported at their shaft holes 9 by the supporting shafts 12 projected from the actuating disc 11 for allowing their rotation. However, the planetary gears 10 may have projected supporting shafts to be fitted to shaft holes formed in the actuating disc 11. Any modification may thus be adopted so far as the planetary gears 10 can be rotated on their axes and the actuating disc 11 can be rotated in accordance with the rotation of the planetary gears 10 about the driving sun gear 6. The controller 19 is not restricted to the roller shape, but may be of any suitable shape, such as a ball, so far as it could act as a wedge in one direction and as a rotation reducer in the other direction. Also, the driving of the gear 6 is not restricted to the rotational force of the gear 3, but any other driving means can be adopted.

Figure 4:
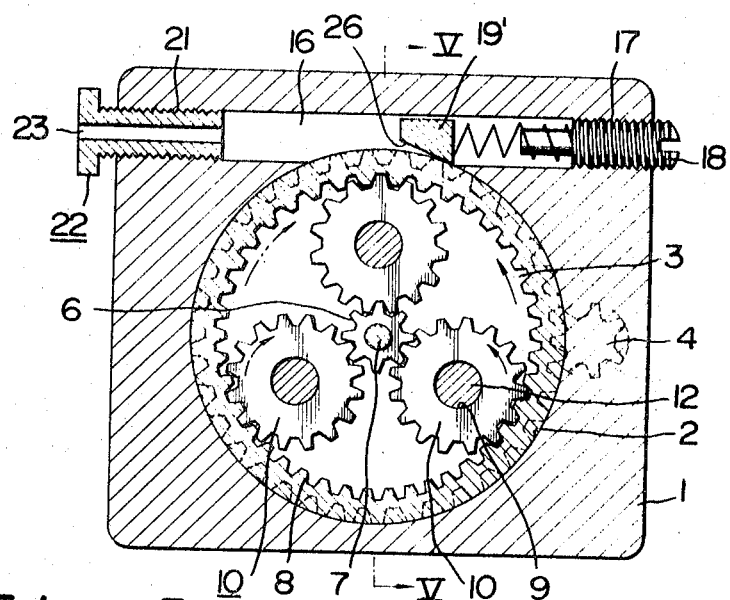
FIGURE 4 shows a front vertical section of a second embodiment wherein control means having an escaping slope is used.
Figure 5:
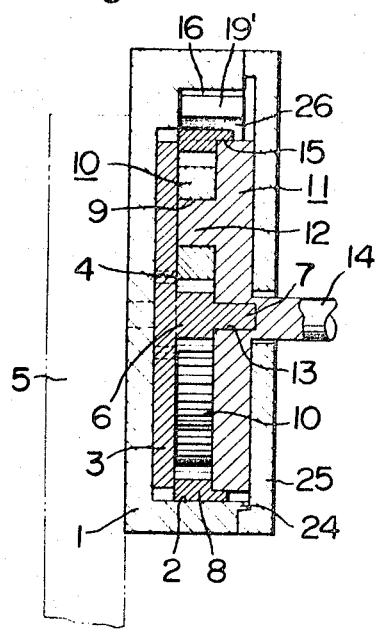
FIGURE 5 is a section taken along line V—V of FIGURE 4.
Figure 6:
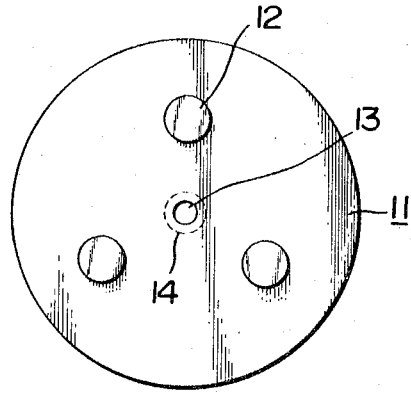
FIGURE 6 is a front view of its actuating disc.

The second embodiment shown in FIGURES 4-6 is identical to the first embodiment illustrated in FIGURES 1-3 and explained in the above, except for the control means 19'. Accordingly, the identical members are shown by same reference numerals as in the first embodiment for abbreviating the explanation and facilitating the understanding of the apparatus.

In the second embodiment, a controller 19' has an escaping slope 26 which forms an appropriate angle tangentially to the outer surface of the internal gear.

By the above modified structure, the second embodiment functions as follows:

When a person on a step-plate arranged in front of the automatic door, the motor is initiated to rotate the rotation gear 3 through the gear 4. The integral driving sun gear 6 is rotated in the direction shown by a solid line in FIGURE 4, and the planetary gears 10 are rotated on their axes in the direction shown by a solid line for urging the internal gear 8 to rotate in the direction shown by a solid line. However, the rotation of the internal gear is reduced to some etxent without causing any wedging action of the controller, because that the appropriate escape 26 is provided with at one end of the controller 19' which is brought into touch with the internal gear at the escape 26.

Accordingly, the planetary gears are rotated on their axes in the direction shown by the solid line while they are slowly rotated about the sun gear 6 in the clockwise direction. The slow rotation of the planetary gears about the sun gear is transmitted to an actuator (not shown) for slowly actuating the door. If the opening movement of the door is prevented by the action of any outer force applied to the door, the rotation of the actuating shaft 14 is stopped and therefore the rotation of the planetary gears about the sun gear is prevented while their rotation on their axes continues. Under these conditions, the internal gear 8 is slowly rotated in the counter-clockwise direction by the driving force of the motor without imparting any excessive load on the motor.

When the person steps out from the step-plate, the motor is rotated reversely to rotate the driving gear 6 in the direction shown by a dotted line. By this rotation of the driving gear 6, the planetary gears are rotated on their axes as shown by a dotted line and push the internal gear 8 in the same direction as shown by a dotted line. Since the internal gear 8 does not freely move due to the force-abutment of the spring-loaded controller 19', the rotation of the internal gear 8 is reduced in spite of the pushing force of the planetary gears. Accordingly, the planetary gears 10 are rotated about the sun gear in the counter-clockwise direction while their rotation on their axes continues. In accordance with the rotation about the sun gear, the actuating shaft 14 is rotated in the counter-clockwise direction through the supporting shaft 12, for closing the door.

If an obstacle such as a part of a human body is caught by the door during the above-mentioned closing operation, the movement of the actuator (not shown) is stopped and then the rotation of the actuating shaft 14 is stopped. Accordingly, the rotation of the planetary gears 10 about the sun gear is prevented by the stoppage of the supporting shaft 12, but continues their rotation on their axes as shown in the dotted line in FIGURE 4. Accordingly, the internal gear 8 is rotated in the clockwise direction shown by the dotted line, pushing the controller 19' towards the adjusting screw 18 against the force of the spring 20. Thus the motor can be rotated as usual without being applied with stopping load.

According to the above-explained second embodiment, the opening and closing operation of the door can be effected slowly or moderately since the internal gear 8 can be rotated in both directions by the provision of the escaping slope 26 on the controller 19' for controlling the rotation in both directions of the internal gear 8.

In the foregoing explanation, the escaping slope 26 is of a linear one, such slope may be of an arcuate one, if desired.

I claim:

1. An apparatus for driving an automatic door operator, comprising a rotation device which comprises a driving sun gear, a plurality of planetary gears surrounding said driving sun gear in meshed relation therewith, and an internal gear arranged in meshed relation with said planetary gears; an actuating device which comprises an actuating disc having an actuating shaft for actuating a door operating actuator and connected to said planetary gears to rotate said actuating disc around said sun gear in accordance with the rotation of said planetary gears and also to rotate said planetary gears on their axes; and control means arranged in force contact with said internal gear, said control means being adjustably urged onto said internal gear by means of a spring and an adjusting screw, whereby said control means acts as a wedge to brake the rotation of the rotation device.

2. An apparatus as claimed in claim 1, wherein said control means has a cylindrical shape for enabling the prevention of the rotation to one direction of said internal gear.

3. An apparatus as claimed in claim 2, wherein said control means has an escaping slope for enabling braking of the rotation to both directions of said internal gear.

4. An apparatus as claimed in claim 1 and further comprising releasing means for releasing the engagement of said control means with said internal gear when the former bites the latter.

5. An apparatus as claimed in claim 1, wherein said control means has a spherical shape for enabling the prevention of the rotation to one direction of said internal gear.

References Cited

UNITED STATES PATENTS

| 2,470,317 | 5/1949 | Murphy | 74—785 |
| 2,769,430 | 11/1956 | Geyer | 74—785 X |
| 3,106,997 | 10/1963 | White | 74—785 X |
| 3,115,791 | 12/1963 | Dean | 74—785 X |

ARTHUR T. McKEON, Primary Examiner